Dec. 6, 1938. W. R. CURTISS Re. 20,935

SIGNAL DEVICE

Original Filed Oct. 30, 1936

INVENTOR.
William R. Curtiss

BY

F. Bascom Smith
ATTORNEY.

Reissued Dec. 6, 1938

Re. 20,935

UNITED STATES PATENT OFFICE 20,935

SIGNAL DEVICE

William R. Curtiss, Meriden, Conn., assignor, by mesne assignments, to Air Devices Corporation, a corporation of Delaware Original No. 2,097,291, dated October 26, 1937, Serial No. 108,418, October 30, 1936, which is a division of Serial No. 670,697, May 12, 1933. Application for reissue October 26, 1937, Serial No. 171,082

4 Claims. (Cl. 177—329)

This invention relates to signalling means and more particularly to electrically illuminated signalling apparatus.

This application is a division of applicant's copending application Serial No. 670,697, filed May 12, 1933.

One of the objects of the present invention is to provide a novel signalling unit wherein the light-transmitting portions may be readily, easily and completely cleaned and which is so constructed that the accumulation of dirt on the light-transmitting surfaces is minimized.

Still another object is to provide a signal lamp having novel light-transmitting means whereby the entry of dirt, water and other foreign matter is substantially eliminated without decreasing light transmission as much as the same has been decreased in similar devices heretofore provided.

A further object is to provide a novel signal lamp which is so constructed as to be readily and inexpensively manufactured in large quantities and which is of light weight for a given size, yet sturdy and durable, and adapted for use both indoors and outdoors in all kinds of weather.

A still further object is to provide a novel signalling device which is so constructed as to render the outline of the signal more clear and distinct at much greater distances than those heretofore provided.

The above and further objects and novel features of the invention will more fully appear from the following detailed description when taken in connection with the accompanying drawing. It is to be expressly understood, however, that the drawing is for the purpose of illustration only and is not designed as a definition of the limits of the invention, reference being primarily had for this purpose to the appended claims.

In the accompanying drawing wherein like reference characters refer to like parts throughout the several views.

Figure 1:
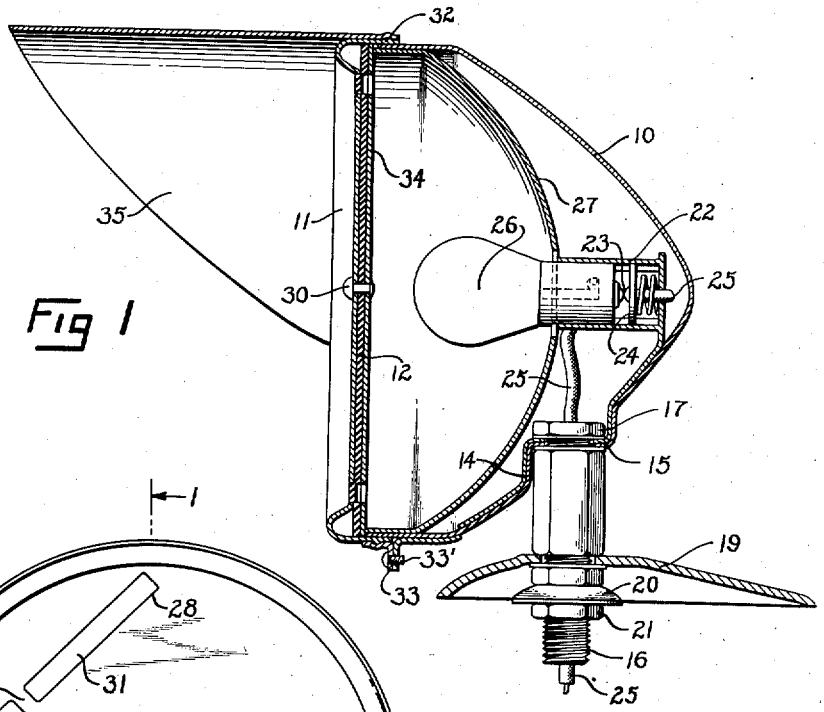
Fig. 1 is a sectional view of one form of novel signal lamp which may be employed in carrying out the present invention, the view being taken on line 1—1 of Fig. 2.
Figure 2:
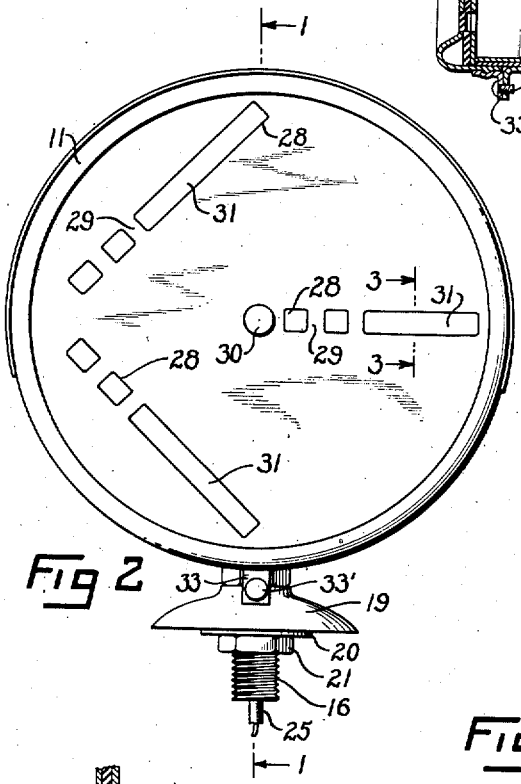
Fig. 2 is a front elevation of the lamp shown in Fig. 1.
Figure 4:
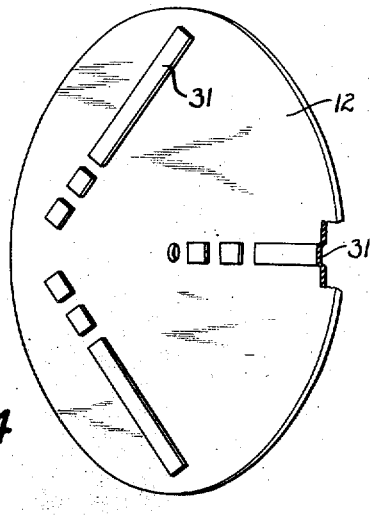
Fig. 4 is a perspective view, with a portion broken away, of one form of a novel translucent disc comprehended by the present invention.
Figure 3:
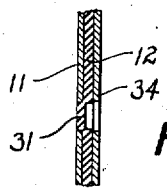
Fig. 3 is a partial section taken on a line 3—3 of Fig. 2.

One embodiment of the novel signalling lamp comprehended by the present invention is illustrated, by way of example (Figs. 1 to 4) as comprising a housing constituted by a shell 10 having a substantially-parabolic section and a flanged front cover 11 forming a bezel for receiving a transparent or translucent disc 12. Preferably shell 10 and cover 11 are stamped from light-weight materials thereby reducing the cost and weight while facilitating the rate of production.

In lighting or signalling units of the above type wherein light weight is desirable much difficulty has been experienced in providing a suitable mounting for the same, since the body portion or shell could not be made strong enough, consistent with desired weight, to withstand the vibrations to which it is subjected. To overcome this difficulty there is provided a narrow steel strip 14 stamped to conform to the contour of shell 10 in an axial direction and welded or otherwise suitably secured to the inner wall thereof. Strip 14 and shell 10 are provided with cooperating indentations forming a horizontal portion 15 by means of which said shell is secured to a suitable mounting-post 16.

As shown, post 16 is tubular and is externally threaded from end to end. The upper end of the same projects through an opening in portion 15, the latter being clamped between a pair of nuts 17 and 18 thereby securely fastening shell 10 to the mounting-post. Any suitable fixture such as a clamping-member 19, washer 20, and nut 21 may be provided for securing post 16 to the frame member, such as a fender of a vehicle.

In addition to serving as a reinforcement for shell 10, strip 14 has its inner end bent upwardly at right angles to the axis of said shell and has a bulb socket 22 concentric with said axis secured thereto by any suitable means such as soldering. Within the socket there is provided a spring-pressed contact 23 carried and centered therein by an insulating washer 24, said contact being directly connected to an electrical lead 25 which is brought into shell 10 through tubular post 16.

Preferably, socket 22 is so positioned that the center of illumination of a bulb 26, held in said socket by means of a bayonet joint, will coincide with the foci of a substantially parabolic reflector 27. The latter, as shown, is mounted within shell 10 and is maintained in a fixed position therein by means of cover 11 which holds a narrow flange of said reflector in engagement with the outer edge of the face of said shell. By positioning the source of light at the foci of reflector 27, the rays will proceed from the latter in parallel lines.

In order to emit the light of bulb 26 in the form of a direction-indicating signal, cover 11 is stamped with openings forming the desired signal or figure. In the illustrated embodiment of the invention a novel form of signal is provided whereby the range of visibility of the same is materially increased. Heretofore signals of the character illustrated, especially those in smaller and desirable sizes, have not proved to be entirely successful in that a clear outline of the signal was not visible except at short distances. The latter difficulty has been due to the diffusion of the light rays which causes the outline of the signal to be obliterated and appear as a solid light.

The above difficulty is overcome by the present invention wherein the signal outline in cover 11 is constituted by a plurality of openings 28 forming broken lines to make up the desired signal, such as the arrow shown. Preferably the lengths of the openings forming a given line of the signal are shortened at points where there is a concentration of light due to the proximity of another line. By so forming the signal in the face of the signal lamp, the diffusion of the light rays tends to accentuate the signal rather than to blur the same since the commingling of the rays is greatly reduced for longer distances and completely eliminated for short distances. The glare produced at a distance by a signal make up of solid lines is thus greatly reduced when such lines are broken such as by means of baffles 29. It is also desirable that the lines making up the signal be separated as much as possible consistent with the formation of the outline desired. The commingling of the light rays is further prevented by the emanation of the rays in parallel lines through openings 28 as pointed out above. The width of openings 28 should be kept as small as possible for night use, but at the same time should be large enough to provide sufficient light intensity to counteract normal daytime illumination. It has been found that a suitable width for the openings 28 in a 4 inch diameter light, should be approximately $\frac{7}{32}$ of an inch.

It has been heretofore proposed to provide signals or signs having a perforated plate of opaque material positioned in front of a source of light and having the perforations or openings so arranged as to form the outline of a desired signal. For the purpose of rendering such a signal more visible and to prevent the entrance of dirt, moisture and other foreign matter into the signal housing, it has also been heretofore proposed to fill said openings by punching or bulging portions of a sheet of paper, cloth or other suitable material that will stretch into or through the same, but signals of this character are extremely frangible and susceptible to damage, the same are not suitable for outside use, and the light-transmitting surfaces of the paper or cloth cannot be satisfactorily cleaned without damaging the same. Others have employed glass or similar translucent material to cover the openings but the material at the point where the same extends into the openings of the opaque plate has been very thick, thereby cutting down the light emission and requiring the provision of a stronger light source for a given amount of light emission and the mounting of said material has been complicated, expensive and unsatisfactory.

For the purpose of overcoming the foregoing difficulties and for coloring the signal amber red or other suitable colors commonly employed in directional signals, for example, a novel translucent disc 12 is secured to the inner face of cover 11 by means of one or more rivets 30 and, if desired, a metal backing plate 34 may be employed. As shown, disc 12 is constituted by a stamp made from celluloid or other suitable substantially rigid, though yieldable, light-transmitting substance and has raised portions 31 thereon corresponding in size and position to openings 28 in cover 11.

The projections 31 thereby seal the housing 10—11 against the entrance of dirt and moisture through openings 28. The thickness of projections 31 is preferably such that the outer faces thereof are substantially flush with the outer face of cover 11 to thereby permit easy cleaning of said raised portions and prevent the accumulation of dirt in openings 28 which would reduce the light emission through said openings. Thus, a signal unit which is carefully designed to give proper light emission for the particular purpose for which it is intended is not rendered less efficient during use by the accumulation of dirt around the edges of openings 28. By stamping disc 12 from a flat plate having uniform thickness, the projections 31 (Fig. 3) have a thickness substantially equal to the thickness of the remainder of the disc and accordingly do not materially hinder the passage of light rays through openings 28. If desired, suitable molded discs of glass, Celluloid or other suitable material but having the same shape as disc 12, i. e., the raised portions 31 and complementary recesses, may be employed in lieu of the stampings above described.

When metal plate 34 is not employed, disc 12 is maintained in contact with the inner face of cover 11 by being clamped between the edge of shell 10 and said cover when the latter is secured in assembled position. As shown, cover 11 is positioned and secured by means of a pin 32 on the shell which projects into an opening in the flange of cover 11, and a suitable clamp constituted by ears 33, secured to shell 10 and cover 11, and retaining member 33'. For daytime use the visibility of the signal is improved by the provision of the visor 35 which may be secured to the flange on cover 11.

There is thus provided a novel signal unit whereby clear and distinct signals may be rendered visible at longer distances than heretofore with a source of light of given intensity and which may be kept clean with little or no trouble. Additionally, the unit is so constructed that the accumulation of dirt on the light-transmitting surfaces which would cause a variation in the effective area of said surfaces is substantially eliminated, thereby insuring a constant predetermined light emission and a clear and distinct signal at distances for which the unit is particularly designed. Although only one embodiment of the invention has been illustrated and described in detail, it is to be expressly understood that various changes, particularly in the design and arrangement of parts illustrated, may be made therein without departing from the spirit and scope of the invention, as will now be clearly understood by those skilled in the art. For a definition of the limits of the invention, reference will be had primarily to the appended claims.

What is claimed is:

1. In a signalling device of the character described, a cover member having a plurality of light-transmitting openings therein in the form of a figure constituting a signal, and a substantially-rigid light-transmitting plate having raised portions extending into the openings in said cover member, said raised portions having the outer surfaces thereof substantially flush with the outer surface of the cover member and the thickness of said raised portions being substantially equal to the thickness of the remainder of the plate.

2. In a signalling device of the character described, a cover member having a light-transmitting opening therein, and a substantially-rigid light-transmitting plate having a raised portion extending into the opening in said cover member, said raised portion having the outer surface thereof substantially flush with the outer surface of the cover member and the thickness of said raised portion being substantially equal to the thickness of the remainder of the plate.

3. In a signalling device of the class described, an opaque metallic cover member having one or more light-transmitting openings therein arranged to form the outline of a signal, a plate of substantially-rigid, moldable, waterproof, translucent material having one or more raised portions on the outer surface thereof and a recess complementary to each of the said raised portions in the other surface thereof, and means for securing said plate to said cover member with said raised portions of the former extending into said openings in the latter.

4. In a signalling device of the class described, an opaque housing cover having one or more openings therein in the form of a figure constituting a signal, and a rigid, translucent plate, said plate having projections extending into said openings and having recesses complementary to said projections, the outer surfaces of said projections being substantially flush with the outer surface of the face of said housing cover.

WILLIAM R. CURTISS.